(12) United States Patent
Kim

(10) Patent No.: US 7,850,566 B2
(45) Date of Patent: Dec. 14, 2010

(54) SYSTEM FOR TRANSMITTING HYDRAULIC PRESSURE

(75) Inventor: Woo Yeol Kim, Gunpo (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 527 days.

(21) Appl. No.: 11/943,789

(22) Filed: Nov. 21, 2007

(65) Prior Publication Data

US 2008/0280727 A1   Nov. 13, 2008

(30) Foreign Application Priority Data

May 7, 2007   (KR)  ...................... 10-2007-0044200

(51) Int. Cl.
*F16H 57/02* (2006.01)
*F16H 57/04* (2006.01)
*F16H 61/00* (2006.01)

(52) U.S. Cl. ...................... 475/159; 74/606 R; 184/6.12

(58) Field of Classification Search ................. 475/159, 475/160; 184/6.12, 11.3; 74/606 R
See application file for complete search history.

(56) References Cited

U.S. PATENT DOCUMENTS

| | | | | |
|---|---|---|---|---|
| 3,466,947 A | * | 9/1969 | Smith | 475/140 |
| 3,613,481 A | * | 10/1971 | Lapinski | 475/116 |
| 4,148,229 A | * | 4/1979 | Kuramochi et al. | 475/59 |
| 4,736,653 A | * | 4/1988 | Hayakawa et al. | 475/146 |
| 5,348,518 A | * | 9/1994 | Taniguchi et al. | 475/285 |
| 5,690,001 A | * | 11/1997 | Matsufuji | 74/606 R |
| 6,135,912 A | * | 10/2000 | Tsukamoto et al. | 475/271 |
| 6,644,440 B2 | * | 11/2003 | Kageyama et al. | 184/11.2 |
| 6,729,206 B2 | * | 5/2004 | Hayabuchi et al. | 74/606 R |
| 2006/0231339 A1 | * | 10/2006 | Enomoto et al. | 184/6.9 |
| 2010/0069192 A1 | * | 3/2010 | Tabata | 475/5 |

FOREIGN PATENT DOCUMENTS

JP   02125175 A   *   5/1990
WO   WO 2007119469 A1   *   10/2007

* cited by examiner

*Primary Examiner*—Tisha D Lewis
(74) *Attorney, Agent, or Firm*—Morgan, Lewis & Bockius LLP

(57) ABSTRACT

A system for transmitting hydraulic pressure in an automatic transmission housed in a transmission case. The system includes a valve body for generating the hydraulic pressure, a first hole unit in the transmission case, and a second hole unit. The first hole unit includes at least one hole perpendicular to an output shaft of the automatic transmission so as to transmit the hydraulic pressure to a first passage. The second hole unit includes at least one additional hole for receiving the hydraulic pressure through the first passage and transmitting the hydraulic pressure to a second passage.

6 Claims, 3 Drawing Sheets

SYSTEM FOR TRANSMITTING HYDRAULIC PRESSURE

CROSS-REFERENCE TO RELATED APPLICATION

This application claims priority to, and the benefit of, Korean Patent Application No. 10-2007-0044200, filed in the Korean Intellectual Property Office on May 7, 2007, the entire contents of which are incorporated herein by reference.

BACKGROUND OF THE INVENTION (a) Field of the Invention

The present invention relates to a system for transmitting hydraulic pressure in an automatic transmission.

(b) Description of the Related Art

Generally, an automatic transmission includes a gear train with several planetary sets, brakes, and clutches. Hydraulic pressure is used to control the brakes and clutches, and is usually transmitted through a passage in or on a transmission case.

The passage increases the weight and volume of the transmission case, wastes material of the transmission case, an increases manufacturing cost.

The above information disclosed in this Background section is only for enhancement of understanding of the background of the invention and therefore it may contain information that does not form the prior art that is already known in this country to a person of ordinary skill in the art.

SUMMARY OF THE INVENTION

A system for transmitting hydraulic pressure in an automatic transmission housed in a transmission case. The system includes a valve body for generating the hydraulic pressure, a first hole unit in the transmission case, and a second hole unit. The first hole unit includes at least one hole perpendicular to an output shaft of the automatic transmission so as to transmit the hydraulic pressure to a first passage. The second hole unit includes at least one additional hole for receiving the hydraulic pressure through the first passage and transmitting the hydraulic pressure to a second passage.

The first hole unit may include a first hole, a second hole, and a third hole, disposed parallel to each other and perpendicular to the output shaft.

The second hole unit may include a first groove that receives the hydraulic pressure from the first hole, and a second groove that receives the hydraulic pressure from the second hole. The additional hole receives the hydraulic pressure from the grooves.

The at least one additional hole may include a fourth hole that communicates with the first groove, a fifth hole that communicates with the second groove, and a sixth hole that communicates with the third hole.

The first groove may be longer than the second groove.

DETAILED DESCRIPTION OF PREFERRED EMBODIMENTS

An exemplary embodiment of the present invention will hereinafter be described in detail with reference to the accompanying drawings.

Figure 1:
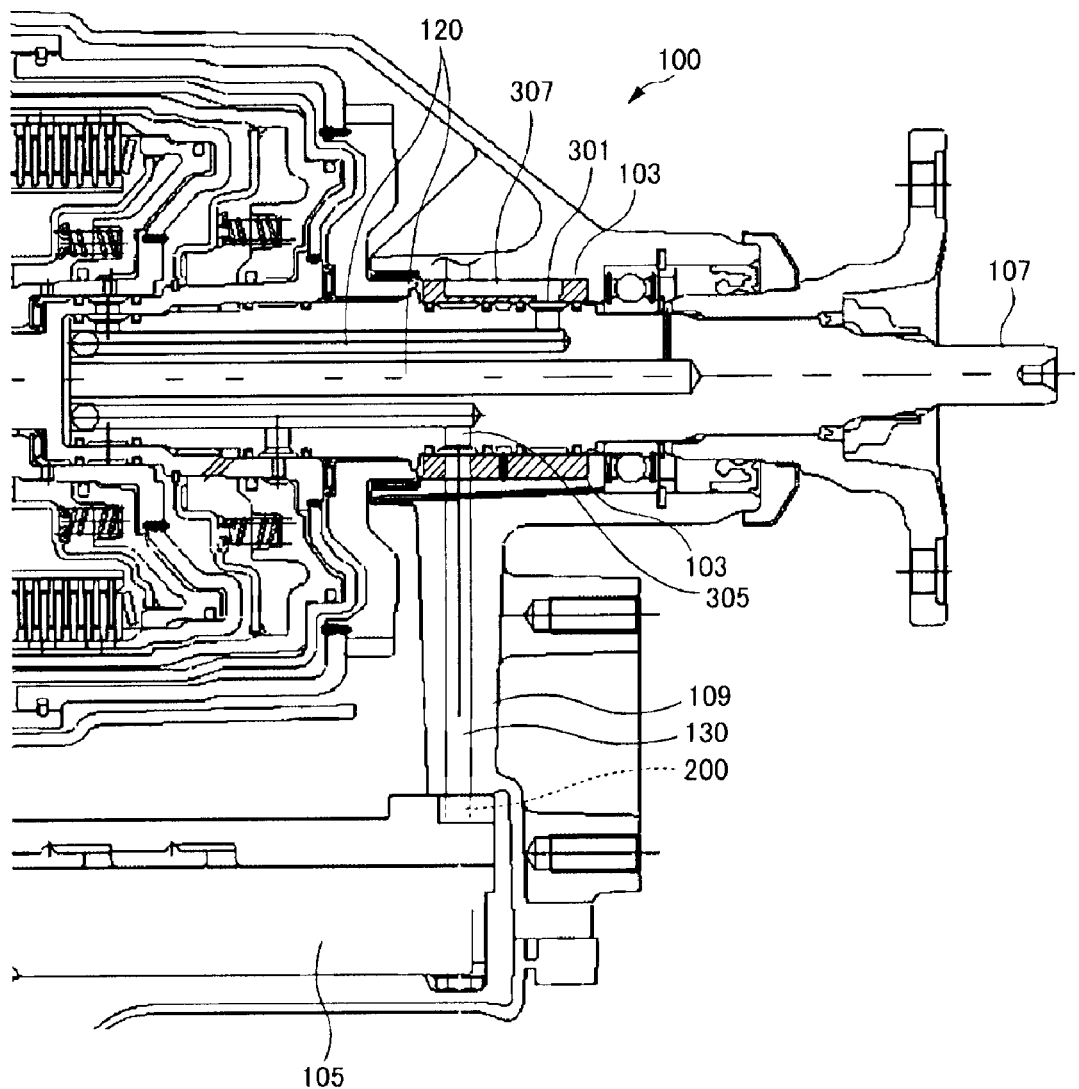
FIG. 1 is a drawing showing a system for transmitting hydraulic pressure according to an exemplary embodiment of the present invention.
Figure 2:
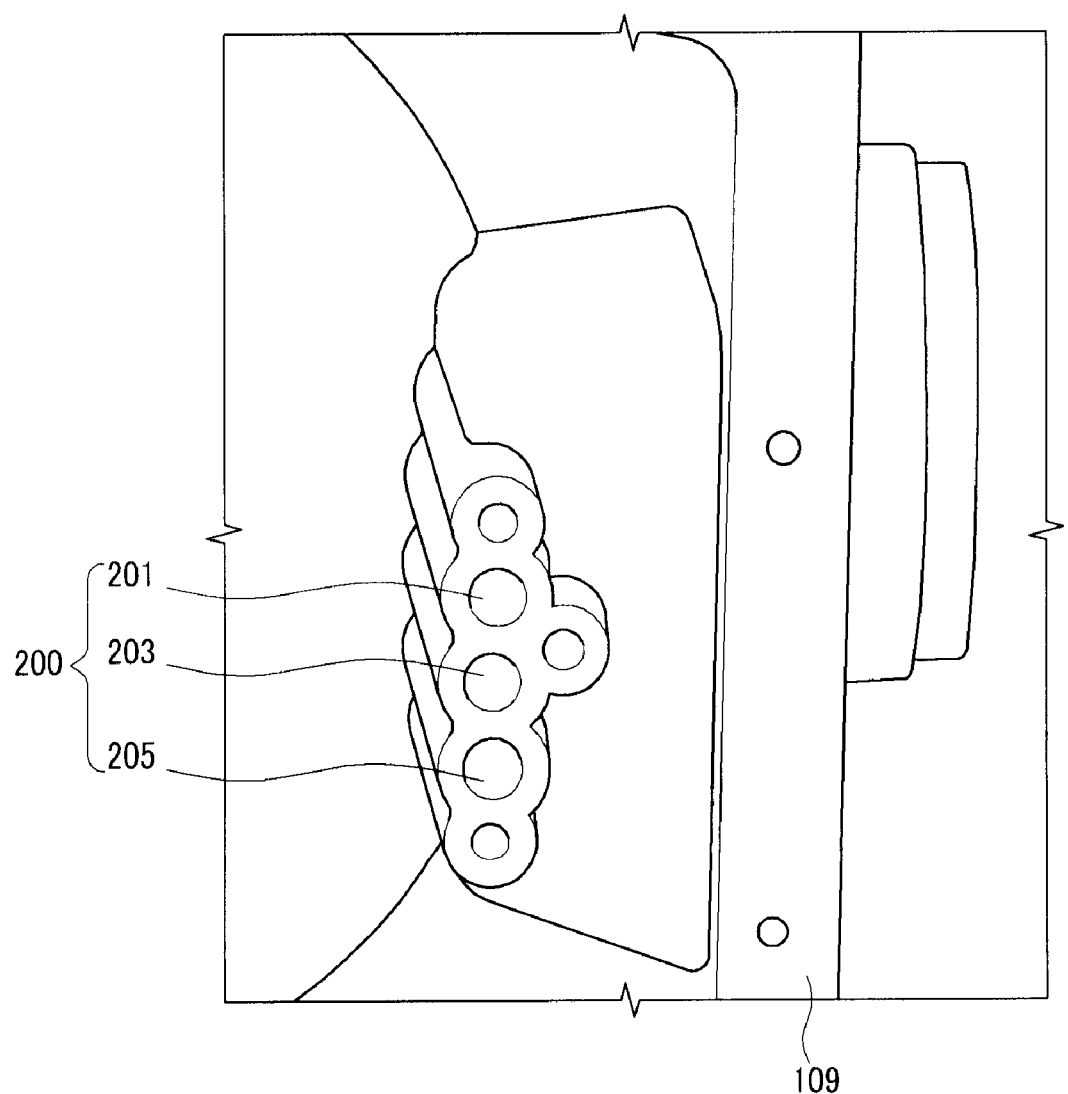
FIG. 2 is a drawing showing a first hole unit of the system of FIG. 1.
Figure 3:
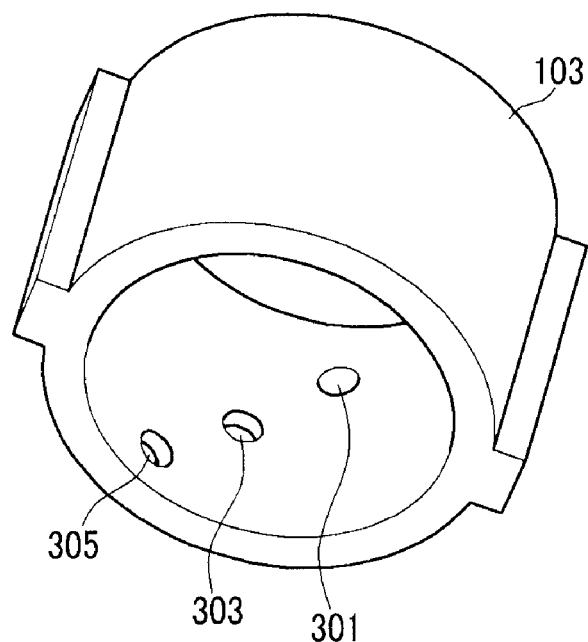
FIG. 3 is a drawing showing a ring of the system of FIG. 1.
Figure 3:
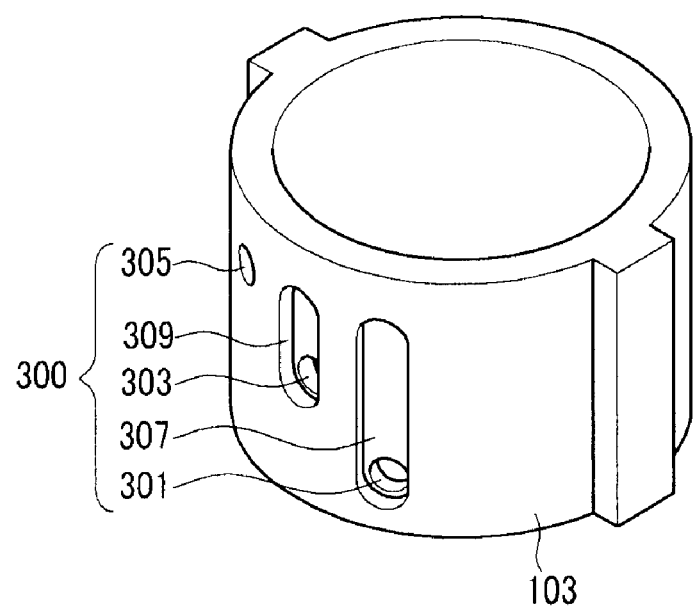

As shown in FIG. 1 to FIG. 3, a system for transmitting hydraulic pressure in an automatic transmission 100 according to an exemplary embodiment of the present invention includes a valve body 105, a first hole unit 200, and a second hole unit 300.

The valve body 105 generates hydraulic pressure. The first hole unit 200 is provided in a case 109 of the automatic transmission 100 and is disposed perpendicular to an output shaft 107 of the automatic transmission in order to transmit the hydraulic pressure to a first passage 130.

The second hole unit 300 includes a ring 103 that transmits the hydraulic pressure through the first passage 130.

That is, the hydraulic pressure is generated in the valve body 105, passes through the first hole unit 200, the first passage 130, and the second hole unit 300, and is then transmitted into the components of the automatic transmission through a second passage 120. The second passage 120 can be designed and implemented by a person of ordinary skill in the art based on the teachings herein.

Referring to FIG. 2, the first hole unit 200 includes a first hole 201, a second hole 203, and a third hole 205 disposed parallel to each other in a direction perpendicular to the output shaft 107.

The first passage 130 is thus divided into three passages in an exemplary embodiment of the present invention, corresponding to each hole 201, 203, 205. This arrangement allows for a small volume of the case 109, as well as low weight, manufacturing cost, and process time.

Referring to FIG. 3, the second hole unit 300 includes a first groove 307, which receives the hydraulic pressure from the first hole 201; and a second groove 309, which receives the hydraulic pressure from the second hole 203. The second hole unit 300 further includes a fourth hole 301, which communicates with the first groove 307; a fifth hole 303, which communicates the second groove 309; and a sixth hole 305, which communicates with the third hole 205 of the first hole unit 200.

Thus, the hydraulic pressure transmitted from the valve body 105 passes through the first through third holes 201, 203, 205, and the first passage 130, and flows into the first groove 307, the second groove 309, and the sixth hole 305. Thereafter, the hydraulic pressure passing through the first groove 307 is transmitted to the fourth hole 301, and the hydraulic pressure passing through the second groove 309 is transmitted to the fifth hole 303.

The hydraulic pressure passing through the fourth through sixth holes 301, 303, 305 is transmitted to the components in the automatic transmission through the second passage 120.

According to an exemplary embodiment of the present invention, because the first groove 307 and the second groove 309 are formed in the ring 103, the direction of the hydraulic pressure can be changed without a separate sloped passage. The manufacturing process can thus be simplified and the manufacturing cost reduced.

In the illustrated embodiment, there is no groove corresponding to the sixth hole 305, but one can be provided by a person of ordinary skill in the art based on the teachings herein if deemed necessary. Also, in the illustrated embodiment, the first groove 307 is longer than the second groove 309, but the present invention is not limited thereto.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for transmitting hydraulic pressure in an automatic transmission, the automatic transmission being housed in a transmission case, the system comprising:
   a valve body for generating the hydraulic pressure;
   a first hole unit in the transmission case, comprising at least one hole disposed substantially perpendicular to an output shaft of the automatic transmission so as to transmit the hydraulic pressure to a first passage; and
   a second hole unit comprising at least one additional hole for receiving the hydraulic pressure through the first passage and transmitting the hydraulic pressure to a second passage,
   wherein the at least one hole comprises at least two holes, disposed substantially parallel to each other and substantially perpendicular to the output shaft, and
   wherein the second hole unit further comprises at least two grooves, each receiving the hydraulic pressure from a respective one of the holes, wherein the at least one additional hole receives the hydraulic pressure from the grooves, and
   wherein one of the grooves is longer than the other groove.

2. The system of claim 1, wherein the at least one additional hole comprises at least two additional holes, each communicating with a respective one of the grooves.

3. The system of claim 1, wherein the at least one hole comprises a first hole, a second hole, and a third hole that are disposed substantially parallel to each other and substantially perpendicular to the output shaft.

4. The system of claim 3, wherein the second hole unit further comprises a first groove that receives the hydraulic pressure from the first hole, and a second groove that receives the hydraulic pressure from the second hole, wherein the at least one additional hole receives the hydraulic pressure from the grooves.

5. The system of claim 4, wherein the at least one additional hole comprises a fourth hole that communicates with the first groove, a fifth hole that communicates with the second groove, and a sixth hole that communicates with the third hole.

6. The system of claim 4, wherein the first groove is longer than the second groove.

* * * * *